US009776507B2

(12) United States Patent
Hart et al.

(10) Patent No.: US 9,776,507 B2
(45) Date of Patent: Oct. 3, 2017

(54) TEMPERATURE BASED FUEL MANAGEMENT IN A VEHICLE FUEL SYSTEM

(75) Inventors: Mitchell E. Hart, Grand Blanc, MI (US); Manoj Tummala, Troy, MI (US); David R Parent, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1668 days.

(21) Appl. No.: 12/967,443

(22) Filed: Dec. 14, 2010

(65) Prior Publication Data

US 2012/0145130 A1 Jun. 14, 2012

(51) Int. Cl.
*F02M 37/00* (2006.01)
*B60K 15/077* (2006.01)
*B60K 15/03* (2006.01)

(52) U.S. Cl.
CPC .... *B60K 15/077* (2013.01); *B60K 2015/0348* (2013.01); *B60K 2015/03111* (2013.01); *B60K 2015/03414* (2013.01)

(58) Field of Classification Search
USPC ................. 123/510, 514, 464, 516
See application file for complete search history.

(56) References Cited

U.S. PATENT DOCUMENTS

| 3,659,965 | A | * | 5/1972 | Ebert et al. | 417/363 |
| 4,893,603 | A | * | 1/1990 | Siebels | 123/514 |
| 5,070,849 | A | * | 12/1991 | Rich et al. | 123/509 |
| 5,085,198 | A | * | 2/1992 | Bartlett et al. | 123/510 |
| 5,197,443 | A | * | 3/1993 | Hodgkins | 123/514 |
| 5,429,096 | A | * | 7/1995 | Fukasawa et al. | 123/514 |
| 5,832,902 | A | * | 11/1998 | Davis et al. | 123/514 |
| 5,881,699 | A | * | 3/1999 | Brown et al. | 123/514 |
| 5,958,237 | A | * | 9/1999 | Cort et al. | 210/416.4 |
| 6,289,879 | B1 | * | 9/2001 | Clausen et al. | 123/516 |
| 6,505,644 | B2 | * | 1/2003 | Coha et al. | 137/565.22 |
| 6,966,306 | B2 | * | 11/2005 | Sawert et al. | 123/509 |
| 8,186,332 | B2 | * | 5/2012 | Sturgess | 123/514 |
| 2013/0061960 | A1 | * | 3/2013 | Jeon et al. | 137/544 |

FOREIGN PATENT DOCUMENTS

| DE | 19750680 A1 | 6/1999 |
| DE | 10208425 A1 | 10/2002 |
| DE | 102006060885 A1 | 6/2008 |

* cited by examiner

*Primary Examiner* — Hai Huynh
*Assistant Examiner* — Gonzalo Laguarda
(74) *Attorney, Agent, or Firm* — Quinn IP Law

(57) ABSTRACT

A vehicle fuel system for use in a vehicle having an engine. The system includes a fuel tank having a fuel pump module area and a bulk area, and a fuel pump mounted in the fuel pump module area, having an inlet and an outlet. A thermostatic valve has a fuel inlet connected to a return fuel line from the engine, a first outlet and a second outlet, with the valve directing fuel through the first outlet when the temperature is below a threshold and directing fuel through the second outlet when the temperature is above the threshold. A cold fuel line connects to the first outlet of the valve and directs fuel to the fuel pump inlet, and a warm fuel line connects to the second outlet of the valve and directs fuel into the bulk area of the fuel tank away from the fuel pump.

9 Claims, 1 Drawing Sheet

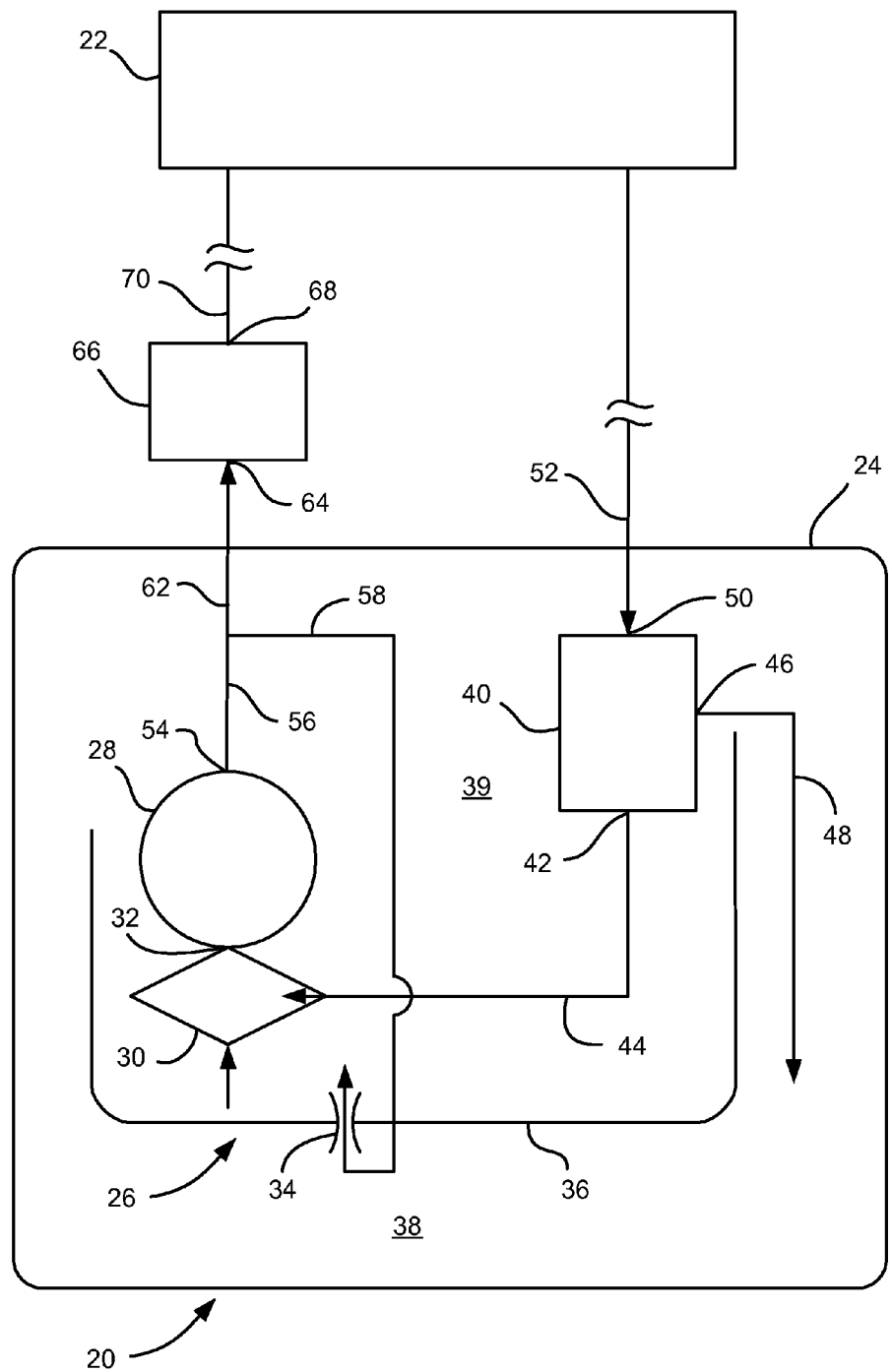

TEMPERATURE BASED FUEL MANAGEMENT IN A VEHICLE FUEL SYSTEM

BACKGROUND OF INVENTION

The present invention relates generally to fuel system assemblies for use on vehicles.

Vehicles that use diesel engines to operate create a concern with flow of the diesel fuel during cold weather conditions. This flow concern can make starting and operating the engine more difficult in these cold conditions. In addition, diesel engines may utilize fuel as a coolant, lubricant and actuation fluid, where the heated fuel is returned to the bulk fuel tank to be cooled. The performance of the cooling strategy is dependent upon the ability to minimize the temperature of the fuel delivered to the engine and so is dependent upon the ability to separate returning hot fuel from delivered cool fuel.

Attempting to overcome the concern with cold diesel fuel, thermally controlled valves have been employed that direct return fuel directly to the fuel filter inlet (only) from the return fuel line. This system, however, requires a low fuel feed pressure to operate properly, i.e., the fuel feed pressure must be less than the return fuel pressure. This limits the applicability and effectiveness of such a system.

SUMMARY OF INVENTION

An embodiment contemplates a vehicle fuel system for use in a vehicle having an engine. The system may include a fuel tank having a fuel pump module area and a bulk area, and a fuel pump mounted in the fuel pump module area and having an inlet and an outlet. Also, a thermostatic valve has a fuel inlet connected to a return fuel line from the engine, a first outlet and a second outlet, with the thermostatic valve directing fuel through the first outlet when the temperature is below a predetermined threshold and directing fuel through the second outlet when the temperature is above the predetermined threshold. A cold fuel line connects to the first outlet of the thermostatic valve and extends to direct fuel adjacent to the inlet to the fuel pump, and a warm fuel line connects to the second outlet of the thermostatic valve and extends to direct fuel into the bulk area of the fuel tank away from the fuel pump.

An embodiment contemplates a method of controlling a flow of fuel in a fuel system of a vehicle having an engine, the method comprising the steps of: pumping fuel with a fuel pump mounted in a fuel tank through a fuel supply line to the engine; returning fuel from the engine through a return fuel line to a thermostatic valve; when the fuel flowing through the thermostatic valve is below a predetermined temperature threshold, directing the fuel through a first outlet from the thermostatic valve through a cold fuel line to an area adjacent to an inlet to the fuel pump; and when the fuel flowing through the thermostatic valve is not below the predetermine temperature threshold, directing the fuel through a second outlet from the thermostatic valve through a warm fuel line to a bulk area of the fuel tank away from the fuel pump.

An advantage of an embodiment is that the vehicle fuel system provides warming of cold fuel fed into the fuel pump and fuel filter, while directing hot fuel away from the fuel pump inlet. This functionality is provided without requiring that the fuel feed pressure is less than the return fuel pressure—the two can be independent of each other. The return fuel during cold fuel conditions is fed to the fuel pump inlet without mixing with the cold bulk fuel, thus providing warmer fuel to the pump and filter under this condition. The returning fuel can bypass the strainer to limit the strainer flow restriction, if desired. During warm fuel conditions, the return fuel is directed into and mixes with the bulk fuel in the fuel tank, to improve hot fuel management. A venturi jet, used to draw fuel from the bulk fuel area into the fuel pump module area, may be powered by the fuel pump directly in order to decouple it from return fuel and maximize return fuel flow utilization.

BRIEF DESCRIPTION OF DRAWINGS

The FIGURE is a schematic view of a vehicle fuel system.

DETAILED DESCRIPTION

Referring to the FIGURE, a vehicle fuel system, indicated generally at 20, is shown. The vehicle fuel system 20 directs fuel, such as diesel fuel, to an engine 22 and returns unused fuel from the engine 22. The fuel system 20 can be a high or a low pressure fuel system.

The fuel system 20 includes a fuel tank 24 that holds the fuel. A fuel pump module 26 is mounted in the tank 24 and may include a fuel pump 28, a strainer 30 at an inlet 32 to the pump 28, and a venturi jet 34. Fuel from the tank 24 may flow through the walls of the strainer 30 to the pump inlet 32. A reservoir wall 36 may be located in the tank 24 surrounding the fuel pump module components to contain the fuel close to the fuel pump 28 (a fuel pump module area 39). This reservoir wall 36 separates the fuel in the module area 39 from the fuel in the bulk area 38 of the tank 24.

A thermostatic valve 40 may be mounted in the tank 24. The valve 40 has a first outlet 42 that directs fuel through a fuel line 44 into the strainer 30 adjacent to the inlet 32 to the pump 28. Thus, the fuel directed through this line 44 bypasses flowing through the strainer (i.e., it is not strained again). A second outlet 46 of the valve 40 directs fuel through a fuel line 48 outside of the reservoir wall 36 and releases the fuel into the bulk area 38 of the tank 24. An inlet 50 to the valve 40 receives return fuel through a return fuel line 52 from the engine 22. The thermostatic valve 40 is configured to direct the fuel through the first outlet 42 when the fuel is cold and through the second outlet 46 when the fuel is warm (or hot). Thermostatic valves that direct a fluid flow based on the temperature of the fluid are known to those skilled in the art and so the details of the valves will not be discussed further herein.

The fuel pump 28 has an outlet 54 that directs fuel into a fuel line 56, which splits into a first portion 58 that directs some of the fuel to the venturi jet 34, which draws fuel from the bulk area 38 into the fuel pump module area 39, and a second portion 62 that directs some of the fuel to an inlet 64 of a fuel filter and water separator 66. An outlet 68 of the filter and water separator 66 directs fuel through a fuel line 70 to the engine 22.

The operation of the vehicle fuel system 20 will now be discussed. When the engine 22 is started during conditions where the fuel is cold, the fuel pump 28 will pump fuel in through the strainer 30 and push it through the fuel line 56. Some of the fuel will be directed through the venturi jet 34 and the rest is directed through the fuel filter and water separator 66 and on into the engine 22. The fuel directed through the venturi jet 34 causes fuel to be drawn from the bulk fuel area 38 into the fuel module area 39.

The fuel not used by the engine 22 is directed through the return fuel line 52 to the thermostatic valve 40. Due to the fact that the fuel is still cold, the thermostatic valve 40 will automatically direct return fuel from the engine 22 through the cold fuel line 44 to the inlet 32 of the fuel pump 28, bypassing the strainer 30, which reduces any potential flow restrictions from the strainer 30. This concentrates the somewhat warmer fuel returning from the engine 22 at the fuel pump inlet 32, which improves flow into the fuel pump 28. This concentration of somewhat warmer fuel also makes fuel flow through the filter and water separator 66 easier, as cold fuel does not tend to flow easily through this filter 66. The return fuel avoids mixing with the cold bulk fuel in the fuel tank, thus providing warmer overall fuel into the fuel line 56 on cold days. Alternatively, the fuel in the cold fuel line 44 may be directed to the strainer 30 (thus still flowing through the strainer 30) rather than bypassing the strainer 30. Also, the cold fuel line 44 may direct the fuel directly into the inlet 32 of the fuel pump 28 or may just direct the fuel into the strainer 30 (bypassing the strainer 30), but only in an area adjacent to the inlet 32 to the fuel pump 28.

When the engine 22 is operating and the fuel is warm, the thermostatic valve 40 directs the returning fuel through the second outlet 46 and through the warm fuel line 48 out into the bulk area 38 of the fuel tank, away from the fuel pump inlet 32. In this situation, when hot fuel returns from the engine 22, it mixes with the cooler bulk fuel in the tank 24, limiting the possible high temperature fuel being pulled into the fuel pump 28. This is advantageous in that the fuel drawn through the fuel pump 28 may be used as a coolant for the engine (or for other uses).

While certain embodiments of the present invention have been described in detail, those familiar with the art to which this invention relates will recognize various alternative designs and embodiments for practicing the invention as defined by the following claims.

What is claimed is:

1. A vehicle fuel system, for use in a vehicle having an engine, comprising:
    a fuel tank having a fuel pump module area and a bulk area;
    a fuel pump mounted in the fuel pump module area and having an inlet and an outlet;
    a thermostatic valve having a fuel inlet connected to a return fuel line from the engine, a first outlet and a second outlet, the thermostatic valve configured to direct a fuel through the first outlet when a temperature of the fuel flowing from the return fuel line is below a predetermined threshold and to direct the fuel through the second outlet when the temperature is above the predetermined threshold;
    a cold fuel line connected to the first outlet of the thermostatic valve and extending to direct fuel adjacent to the inlet to the fuel pump; and
    a warm fuel line connected to the second outlet of the thermostatic valve and extending to direct fuel into the bulk area of the fuel tank away from the fuel pump.

2. The vehicle fuel system of claim 1 including a strainer mounted around the fuel pump inlet and configured to cause fuel flowing from the fuel tank into the fuel pump to be strained, and wherein the cold fuel line directs the fuel to the fuel pump inlet without being strained by the strainer.

3. The vehicle fuel system of claim 2 including a fuel supply line directing fuel from the fuel pump outlet toward the engine, and a fuel filter connected to the fuel supply line and configured to filter the fuel flowing from the fuel pump outlet to the engine.

4. The vehicle fuel system of claim 3 wherein the fuel filter includes a water separator configured to separate water from the fuel.

5. The vehicle fuel system of claim 1 including a fuel supply line directing fuel from the fuel pump outlet toward the engine, and a fuel filter connected to the fuel supply line and configured to filter the fuel flowing from the fuel pump outlet to the engine.

6. The vehicle fuel system of claim 5 wherein the fuel filter includes a water separator configured to separate water from the fuel.

7. The vehicle fuel system of claim 1 including a fuel supply line directing fuel from the fuel pump outlet toward the engine, a venturi fuel line branching off from the fuel supply line, and a venturi jet connecting to the venturi fuel line, the venturi jet located to pull fuel from the bulk area into the fuel pump module area.

8. The vehicle fuel system of claim 1 including a reservoir wall separating the fuel pump module area and the bulk area.

9. The vehicle fuel system of claim 1 wherein the fuel is diesel fuel.

* * * * *